UNITED STATES PATENT OFFICE.

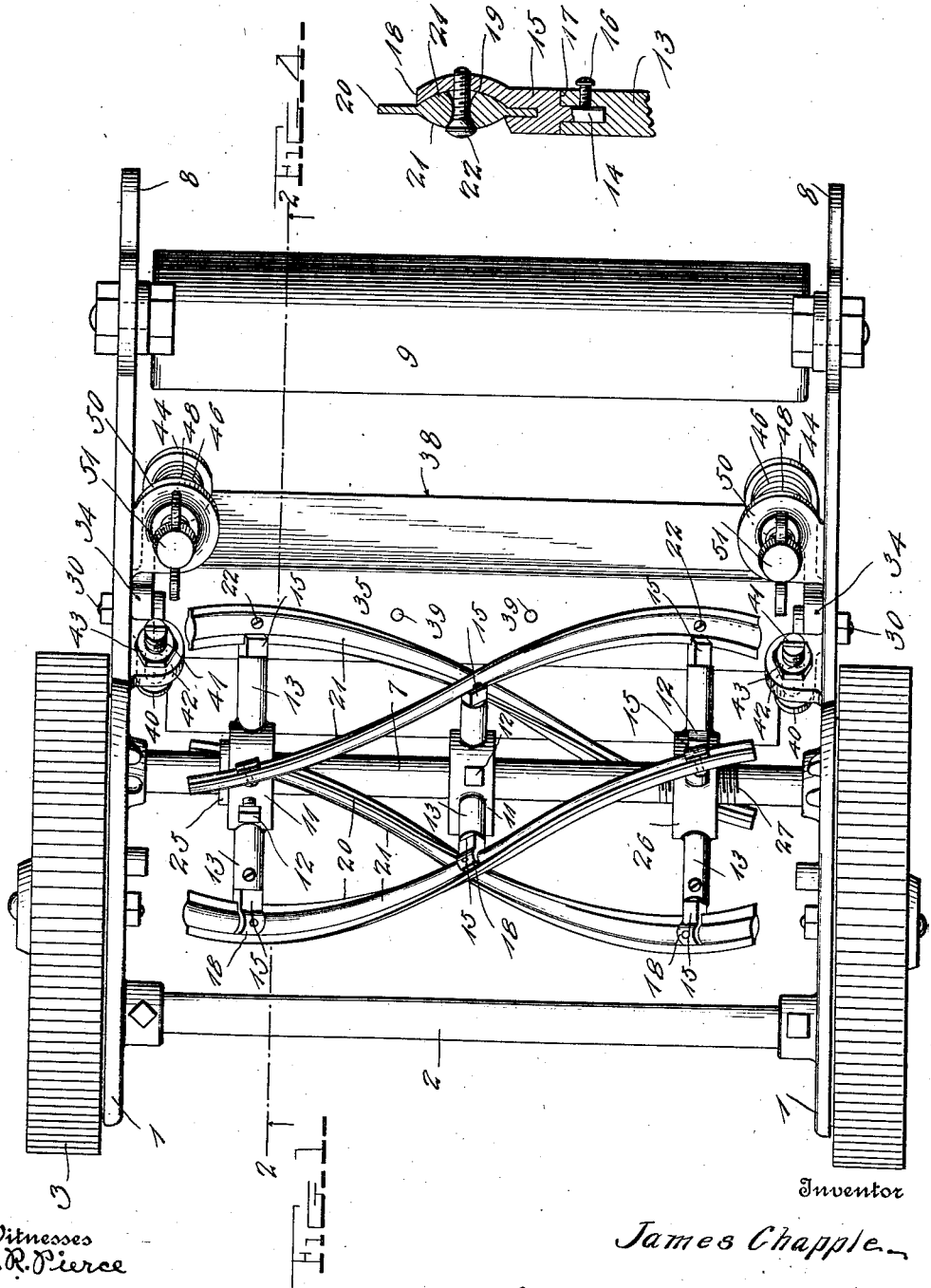

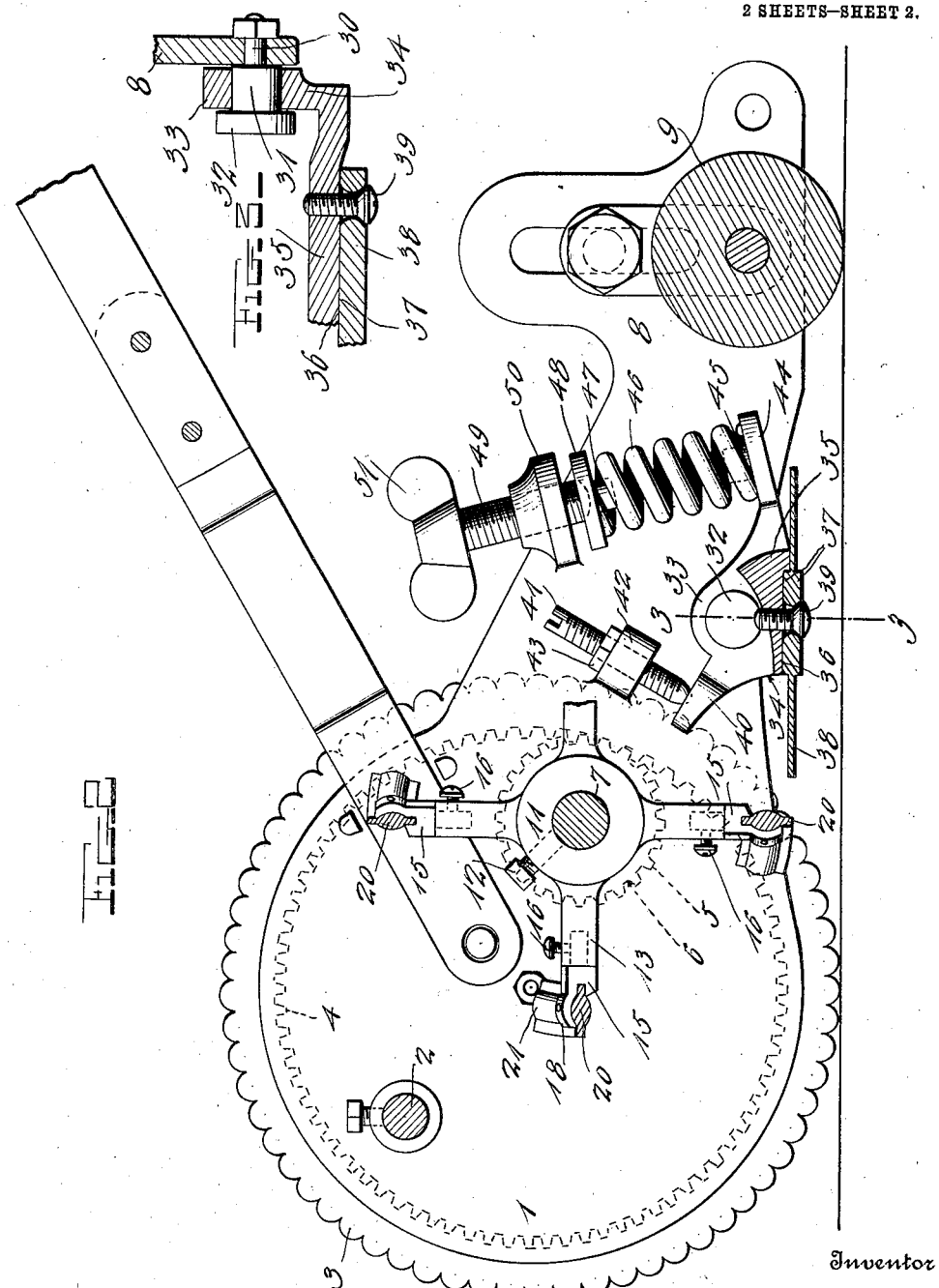

JAMES CHAPPLE, OF CLEVELAND, OHIO.

LAWN-MOWER.

1,058,843.  Specification of Letters Patent.  Patented Apr. 15, 1913.

Application filed July 1, 1912. Serial No. 707,048.

*To all whom it may concern:*

Be it known that I, JAMES CHAPPLE, a subject of Great Britain, residing at Cleveland, in the county of Cuyahoga and State of Ohio, have invented certain new and useful Improvements in Lawn-Mowers; and I do declare the following to be a full, clear, and exact description of the invention, such as will enable others skilled in the art to which it appertains to make and use the same.

This invention is a lawn mower; and its objects are to permit a tilting of the relatively fixed knife or blade so that none of the knives or blades will be nicked when the machine strikes a stone; and to permit the removal, adjustment, and inversion of the rotating knives or blades, as well as the adjustment of their angle to the cutting edge of the fixed knife. These objects are carried out by constructing the machine in the manner hereinafter more fully described and claimed and as shown in the drawings, wherein—

Figure 1 is a plan view of this machine, and Fig. 2 is a longitudinal section on the line 2—2 of Fig. 1; Fig. 3 is a sectional detail on the line 3—3 of Fig. 2, and Fig. 4 is an enlarged sectional detail through one of the blade holders, giving a cross section of the spiral blade engaged therewith.

It will not be necessary to describe the construction of the handle and framework of this lawn mower, further than to say that the numeral 1 designates the housings connected by a rod 2, 3, 3 are the main wheels whereof one (or possibly both) may be internally toothed as at 4 so as to mesh with external teeth 5 on a ratchet mechanism 6 connected with one end (or perhaps both ends) of the main shaft 7 which carries the cutter head. The housings 1 are continued to the rear into side plates 8 between which is mounted a roller 9 as usual in lawn mowers and whose details need not be described, and the connection of the handle with the head of this machine is not important to the present invention.

The cutter head carrying the spiral blades includes a number of spiders having their hubs 11 mounted upon the main shaft 7 by means of set screws 12 and their radial arms 13 each provided with a round hole in its outer end; and in said hole fits revolubly the reduced inner end 14 of a blade holder 15 which is rendered adjustable therein by means of a set screw 16 so that the holder may be turned axially with respect to the arm 13, may be set farther outward or inward until its shoulder 17 contacts with the outer end of the arm, or may be removed entirely. The outer end of the holder is forked, and the rear arm 18 of its fork is dished slightly as shown at 19. The blade 20 has a substantially rectangular cross section so that four cutting corners are provided, but along its center it is enlarged as at 21 to form what might be called ribs on both sides, either of which ribs fits the dished portion 19 of the rear arm 18 closely; and at suitable intervals screws 22 pass through these ribs along the center of the blade and take into the arms 18 of the holders 15 to hold the blades therein. The upper hub in Fig. 2 rests against a collar 25 on the main shaft 7, whereas the lower hub 26 is internally threaded to engage a screw 27 near the other end of said shaft, although by preference this hub also has a set screw 12 like the others; and when this set screw is loosened and this hub turned, it will be obvious that it will progress along the shaft toward or from the collar 25. When all the set screws are loosened excepting that one in the upper hub, all the hubs can be turned upon the shaft so that the spiral disposition of the several blades 20 can be increased or decreased, while yet retaining the cylindrical contour of the cutter head as a whole, and it will be obvious that the cutting edges or outer forward corners of the various blades must pass across the cutting edge of the relatively fixed knife described below so that the moving blades will coact with the fixed blade to cut the grass.

The numeral 30 designates bolts passing through the side plates 8 and having shoulders 31 under their heads 32, and on the shoulder of each bolt inside said plate is pivotally mounted the eye 33 of a rocker arm 34, which extends along within the side plate, and the two arms being connected by a transverse bar 35 which is recessed on its under side as at 36 to receive the enlarged or ribbed center 37 of the relatively fixed knife or blade 38—all as best seen in Fig. 1. Through the enlarged center of this blade at suitable points are passed screws 39 whose threaded extremities extend upward into the bar 35 and hold the blade thereto. This blade has four cutting corners or edges, and it can be reversed and inverted like the other blades; and in fact it may be possible to make it in duplicate with the other blades, although I have shown it as somewhat wider and its enlarged portion as rectangular instead of rounded. The forward end of each rocker arm 34 has a nose 40 upon which bears a set screw 41 that is passed downward through a lug 42 cast within the side plate 8, and a jam nut 43 holds this screw from movement. The obvious purpose of this screw is to prevent the nose of the rocker arm from rising too far, and therefore to prevent the bar 35 from turning to the rear so far that the cutting corner of the blade 38 will be struck by the cutting corner of the rotating blades 20. The rear end of each rocker arm 34 has a heel 44 from which rises a stud 45, and 46 is a coiled expansive spring whose lower end rests upon the heel around said stud while its upper end surrounds a similar stud 47 depending from a washer 48; and the latter is borne downward by a screw 49 which is threaded through a lug 50 cast upon the inner side of the plate 8, the screw preferably having a thumb piece 51 at its upper end. The obvious purpose of this detail of construction is to permit the adjustment of the screw by turning the thumb piece, and the spring exerts a yielding force to depress the heel 44 of the rocker arm so that its nose is thrown normally upward into contact with the tip of the screw 41 as shown. When this improved lawn mower strikes a stone or other obstruction, it is carried to the rear under the rotating blades 20, and as it strikes the front edge of the blade 38, the latter is permitted to tip downward as the spring 46 compresses—thereby preventing the possibility that such foreign substance will break or nick either of the cutting blades. By enlarging the center of the relatively fixed blade 38, this also can be reversed or inverted so that its four cutting edges can be successively brought into action, and it will be a long time before it will need grinding.

The action of the roller 9 is well known, and the uses of lawn mowers need not be elaborated in this specification.

I reserve the right to make changes in details as come within the sphere of this invention, and the sizes, proportions and materials of parts are not essential.

What is claimed as new is:—

1. In a lawn mower, the combination with a cutting blade substantially rectangular in cross section and having cutting faces at its four corners, its body being provided on both sides with longitudinal ribs along its transverse center; of a supporting member for said blade whose face is dished to correspond with the contour of one of said ribs, and a screw passing through the blade where it is ribbed and taking into said member, for the purpose set forth.

2. In a rotary cutter head for machines of the class described, the combination with a main shaft having a collar at one end and a thread at the other, a series of arms having hubs mounted on said shaft, one of the hubs resting against said collar and another being internally threaded to engage said thread, the outer ends of said arms having axial holes, and means for fastening the hubs on the shafts after they have been set; of blade holders adjustably mounted in said holes, and resilient blades carried by the holders.

3. In a rotary cutter head for machines of the class described, the combination with a main shaft having a collar at one end and a thread at the other, a series of arms having hubs mounted on said shaft, one of the hubs resting against said collar and another being internally threaded to engage said thread, the outer ends of said arms having axial holes, and means for fastening the hubs on the shafts after they have been set; of resilient blades, blade holders each forked at its outer end and attached to a blade and having its inner end shouldered and the reduced portion entering the hole in one of said arms, and a set screw through the latter against said reduced portion, for the purpose set forth.

4. In a cutter head for machines of the class described, the combination with a main shaft, hubs mounted thereon and each having a series of arms, means for moving one hub longitudinally of the shaft, and set screws through the other hubs against the shaft, the outer end of each arm having an axial hole; of blade holders adjustably mounted in said holes, and resilient blades carried by the holders.

5. In a cutter head for machines of the class described, the combination with a main shaft, a series of arms having hubs mounted thereon, and set screws through the hubs against the shaft, the outer end of each arm having an axial hole; of resilient blades, blade holders each forked at its outer end and attached to a blade and having its inner end shouldered and the reduced portion entering the hole in one of said arms, and a set screw through the latter against said reduced portion, for the purpose set forth.

6. In a cutter head for machines of the class described, the combination with a main shaft, and a series of arms adjustably mounted at their inner ends on said shaft and having holes in their outer ends; of blade holders each forked at its outer end with the rearmost fork arm projected beyond the other and dished, and each having its inner end seated in one of said holes, a set screw through the arm against said inner end, and a series of resilient blades each of substantially rectangular cross section with ribs on both sides along its transverse center, its inner edge resting in the throat of
5 the fork, one of its ribs in said dished arm, and its outer edge projecting beyond this arm, for the purpose set forth.

In testimony whereof I have hereunto set my hand in presence of two subscribing witnesses.

JAMES CHAPPLE.

Witnesses:
 THOMAS MANN,
 H. J. TERRY.